(12) United States Patent
Dinicola et al.

(10) Patent No.: US 9,058,221 B2
(45) Date of Patent: Jun. 16, 2015

(54) SIGNAL PROCESSING AT A TELECOMMUNICATIONS ENDPOINT

(75) Inventors: Brian K. Dinicola, Monroe Township, NJ (US); David S. Mohler, Arvada, CO (US)

(73) Assignee: Avaya, Inc., Basking Ridge, NJ (US)

( * ) Notice: Subject to any disclaimer, the term of this patent is extended or adjusted under 35 U.S.C. 154(b) by 2903 days.

(21) Appl. No.: 11/381,780

(22) Filed: May 5, 2006

(65) Prior Publication Data

US 2007/0274501 A1    Nov. 29, 2007

(51) Int. Cl.
*G06F 9/50* (2006.01)
*H04L 29/06* (2006.01)
*H04L 29/08* (2006.01)
*H04M 1/725* (2006.01)

(52) U.S. Cl.
CPC ............ *G06F 9/5072* (2013.01); *H04L 67/04* (2013.01); *H04L 67/28* (2013.01); *H04L 65/60* (2013.01); *H04L 65/605* (2013.01); *H04M 1/72525* (2013.01); *G06F 2209/509* (2013.01)

(58) Field of Classification Search
USPC ............. 379/265.01, 265.03, 265.06, 265.11, 379/265.12
See application file for complete search history.

(56) References Cited

U.S. PATENT DOCUMENTS

| 6,275,536 | B1 * | 8/2001 | Chen et al. ............... 375/240.25 |
| 6,363,470 | B1 | 3/2002 | Laurenti et al. |
| 6,445,697 | B1 * | 9/2002 | Fenton ......................... 370/357 |
| 6,842,428 | B2 | 1/2005 | Chen et al. |
| 2002/0007357 | A1 * | 1/2002 | Wong et al. ....................... 707/1 |
| 2002/0072902 | A1 * | 6/2002 | Gerlach et al. ................ 704/229 |
| 2003/0112796 | A1 * | 6/2003 | Kwan ........................... 370/352 |
| 2006/0233163 | A1 * | 10/2006 | Celi et al. ..................... 370/356 |
| 2007/0071000 | A1 * | 3/2007 | Ulupinar et al. .............. 370/389 |

* cited by examiner

*Primary Examiner* — Christopher Crutchfield

(57) ABSTRACT

A method and an apparatus are disclosed that enable the offloading of some of the signal processing that has often been centralized in a telecommunications network, to one or more telecommunications endpoints. In accordance with the illustrative embodiment of the present invention, a packet-based telecommunications endpoint that comprises processing and memory resources determines the resource availability of one or more of its resources. The endpoint transmits the resource availability information to a data-processing system, which then transmits a signal-processing computer program back to the endpoint. The computer program is based on the resources that are available at the endpoint. The endpoint then proceeds to use the computer program to process the signals that are received—for example, during the course of a phone call that involves the endpoint. The signal processing that is performed can include noise reduction, echo cancellation, muting, automatic gain control, and so forth.

19 Claims, 6 Drawing Sheets

SIGNAL PROCESSING AT A TELECOMMUNICATIONS ENDPOINT

FIELD OF THE INVENTION

The present invention relates to telecommunications in general, and, more particularly, to processing one or more received signals at a telecommunications endpoint.

BACKGROUND OF THE INVENTION

FIG. 1 depicts a schematic diagram of telecommunications system 100 in the prior art. Telecommunications system 100 comprises telecommunications network 101; telecommunications endpoints 102-1 through 102-G, wherein G is a positive integer; and call-processing servers 103-1 through 103-H, wherein H is a positive integer. The elements in system 100 are interconnected as shown.

Telecommunications network 101 comprises one or more subnetworks that enable the devices depicted in FIG. 1 to communicate with each other. For example, network 101 might comprise the Public Switched Telephone Network (PSTN), as well as an Internet Protocol-based network and other networks of other types (e.g., cellular network, local area network, etc.). Network 101 comprises infrastructure such as switches, routers, and transmission facilities that enable telecommunications service, such as calling capability, to one or more of telecommunications endpoints 102-1 through 102-G.

Telecommunications endpoints 102-1 through 102-G are capable of originating and receiving calls for end users. Endpoints 102-1 through 102-G are of various types that can include Integrated Services Digital Network (ISDN) endpoints, Internet Protocol-capable endpoints, Session Initiation Protocol (SIP)-based endpoints, cellular endpoints, WiFi-enabled endpoints, and so forth.

Call-processing servers 103-1 through 103-H are data-processing systems that provide telecommunications services to endpoints 102-1 through 102-G. At least some of servers 103-1 through 103-H control calls from one telecommunications endpoint to another, such as from endpoint 102-1 to endpoint 102-5, for example.

One or more of call-processing servers 103-1 through 103-H are also capable of processing signals that are transmitted to or are received from endpoints 102-1 through 102-G. Specialized computer programs that embody signal processing algorithms perform the processing. Sometimes, each computer program is intended to process signals associated with one endpoint only, sometimes each computer program is intended to process signals associated with multiple endpoints, and sometimes multiple computer programs are needed to process the signals associated with one or more endpoints.

SUMMARY OF THE INVENTION

The present invention enables the offloading of some of the signal processing that has often been centralized in a telecommunications network, to one or more telecommunications endpoints. In accordance with the illustrative embodiment of the present invention, a packet-based telecommunications endpoint that comprises processing and memory resources determines the resource availability of one or more of its resources. The endpoint transmits the resource availability information to a data-processing system, which then transmits a signal-processing computer program back to the endpoint. The computer program is based on the resources that are available at the endpoint. The endpoint then proceeds to use the computer program to process the signals that are received—for example, during the course of a phone call that involves the endpoint. The signal processing that is performed can include noise reduction, echo cancellation, muting, automatic gain control, and so forth.

The technique of the illustrative embodiment has application for pre-existing telecommunications endpoints that are capable of receiving, storing, and using programs, as well as for new endpoints. The pre-existing endpoints already use programs that are capable of handling call setup and control. In some embodiments, the pre-existing endpoints have the capability of assessing the resource availability of one or more on-board resources; in some other embodiments, the endpoints do not have the assessment capability, but are able to accept a computer program that is received either through downloading or through other means.

The technique of the illustrative embodiment performs signal processing at the endpoint, where the processing depends on (i) the particular computer program that is downloaded and (ii) the ongoing resource availabilities of one or more endpoint resources. For example, the computer program might specify skipping over data samples that have been read into the endpoint's memory buffer or changing the values of one or more data samples, or a combination of the two. The technique is advantageous over some of the centralized signal processing techniques in the prior art, in that it takes advantage of the unutilized or underutilized resources at each endpoint. For example, where a first endpoint is processor-plentiful and memory-limited, a first computer program that is processor-intensive might be provided and used, and where a second endpoint is memory-plentiful and processor-limited, a second computer program that is memory-intensive might be provided and used.

The illustrative embodiment of the present invention comprises: a receiver for receiving, from a telecommunications network, a first series of data samples that represent a first acoustic signal; a memory for buffering the first series of data samples; and a processor for: i) determining a resource availability of a first resource at the telecommunications endpoint, and ii) generating a second series of data samples, based on: (a) the signal content of the data samples in the first series, and (b) the resource availability of the first resource.

DETAILED DESCRIPTION

Figure 1:
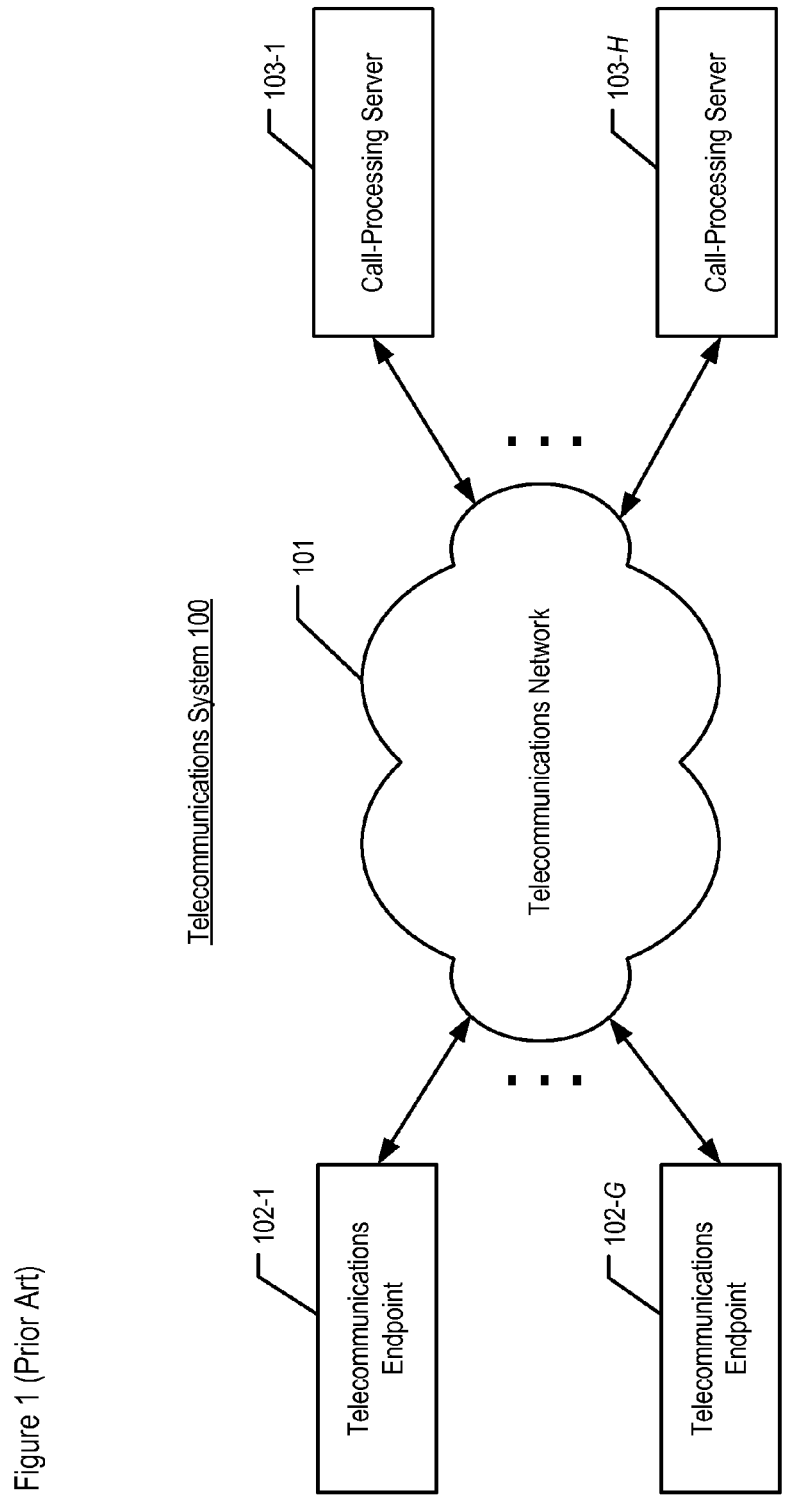
FIG. 1 depicts a schematic diagram of telecommunications system 100 in the prior art.
Figure 2:
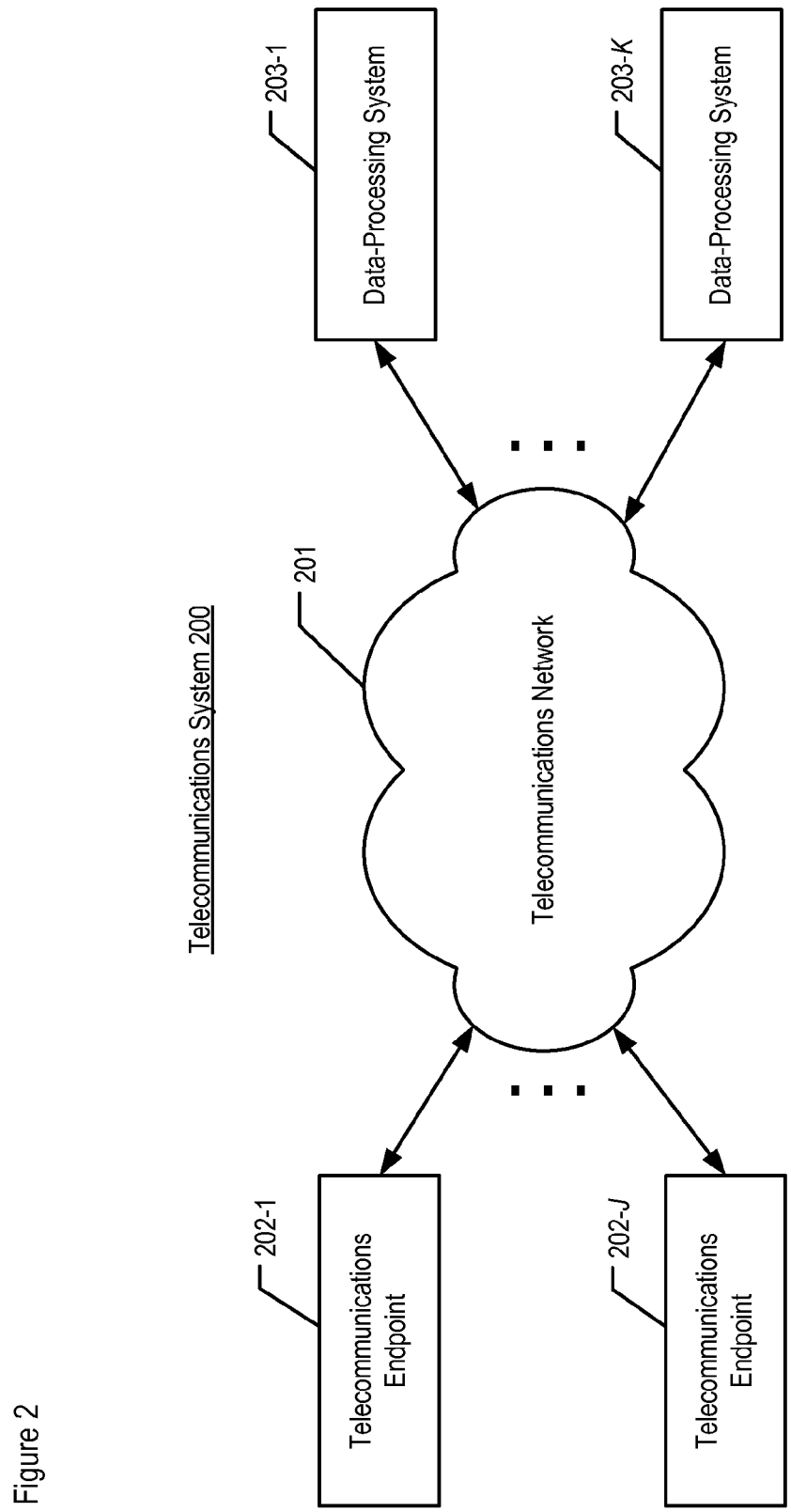
FIG. 2 depicts a schematic diagram of telecommunications system 200 in accordance with the illustrative embodiment of the present invention.

FIG. 2 depicts a schematic diagram of telecommunications system 200 in accordance with the illustrative embodiment of the present invention. Telecommunications system 200 comprises telecommunications network 201; telecommunications endpoints 202-1 through 202-J, wherein J is a positive integer; and data-processing systems 203-1 through 203-K, wherein K is a positive integer. The elements in system 200 are interconnected as shown.

In accordance with the illustrative embodiment, telecommunications network 201 comprises the Public Switched Telephone Network (PSTN). Through PSTN infrastructure, as well as through other infrastructure outside of the PSTN, network 201 provides telecommunications service to telecommunications endpoints 202-1 through 202-J. As those who are skilled in the art will appreciate, in some alternative embodiments, network 201 can comprise a different group of subnetworks than depicted, such as, but not limited to, one or more of the following:
  i. an Internet Protocol-based network, such as the Internet or a private network (e.g., VoIP service provider network, etc.), supported by routers;
  ii. an enterprise network supported by one or more private branch exchanges;
  iii. a cellular network (e.g., CDMA, GSM, etc.) supported by one or more mobile switching centers;
  iv. a wireline (e.g., Ethernet, etc.) or wireless (e.g., WiFi, etc.) local area network (LAN); and
  v. the Public Switched Telephone Network.

FIG. 2 also depicts telecommunications endpoints 202-1 through 202-J of various types. The endpoint types that are represented include Integrated Services Digital Network (ISDN) endpoints 202-1 through 202-3, Internet Protocol endpoints 202-4 through 202-6; Session Initiation Protocol (SIP)-based endpoints 202-7 and 202-8; cellular endpoints 202-9 and 202-10, WiFi-enabled endpoints 202-11 and 202-12, and so forth. As those who are skilled in the art will appreciate, in some alternative embodiments, other types or combinations of endpoints than those depicted can operate in accordance with the present invention. Moreover, the present invention is well-suited for implementation in telecommunications endpoints that operate in either public or private telecommunications systems, where those systems can be wireline or wireless-based, or both.

Telecommunications endpoint 202-$j$, for j=1 through J, are capable of originating and receiving calls for end users in well-known fashion. Endpoint 202-$j$ is also capable of performing the tasks described below and with respect to FIGS. 4 through 6, in accordance with the illustrative embodiment. The salient components of endpoint 202-$j$ are described in detail below and with respect to FIG. 3.

Data-processing system 203-$k$, for k=1 through K, provides telecommunications services to telecommunications endpoints 202-1 through 202-J. In accordance with the illustrative embodiment, data-processing systems 203-1 through 203-K are call processing servers that are capable of controlling calls from one telecommunications endpoint to another, such as from endpoint 202-1 to endpoint 202-5, for example. As those who are skilled in the art will appreciate, in some alternative embodiments, some of data-processing systems 203-1 through 203-K comprise functionality other than call control, such as database functionality, web server functionality, and so forth.

One or more of data-processing systems 203-1 through 203-K are also capable of downloading a computer program to endpoint 202-$j$ in well-known fashion. In accordance with the illustrative embodiment, the downloaded computer program is capable of performing one or more functions at endpoint 202-$j$ such as analyzing a series of data samples that represent a media signal (e.g., audio, etc.). The downloadable computer program can be one of many possible programs, each program being capable of performing a different function that requires a known processing resource requirement (e.g., processor occupancy, memory utilization, etc.) and occupying a known amount of memory when downloaded to endpoint 202-$j$.

It will be clear to those skilled in the art, after reading this disclosure, how to make and use data-processing systems 203-1 through 203-K.

Figure 3:
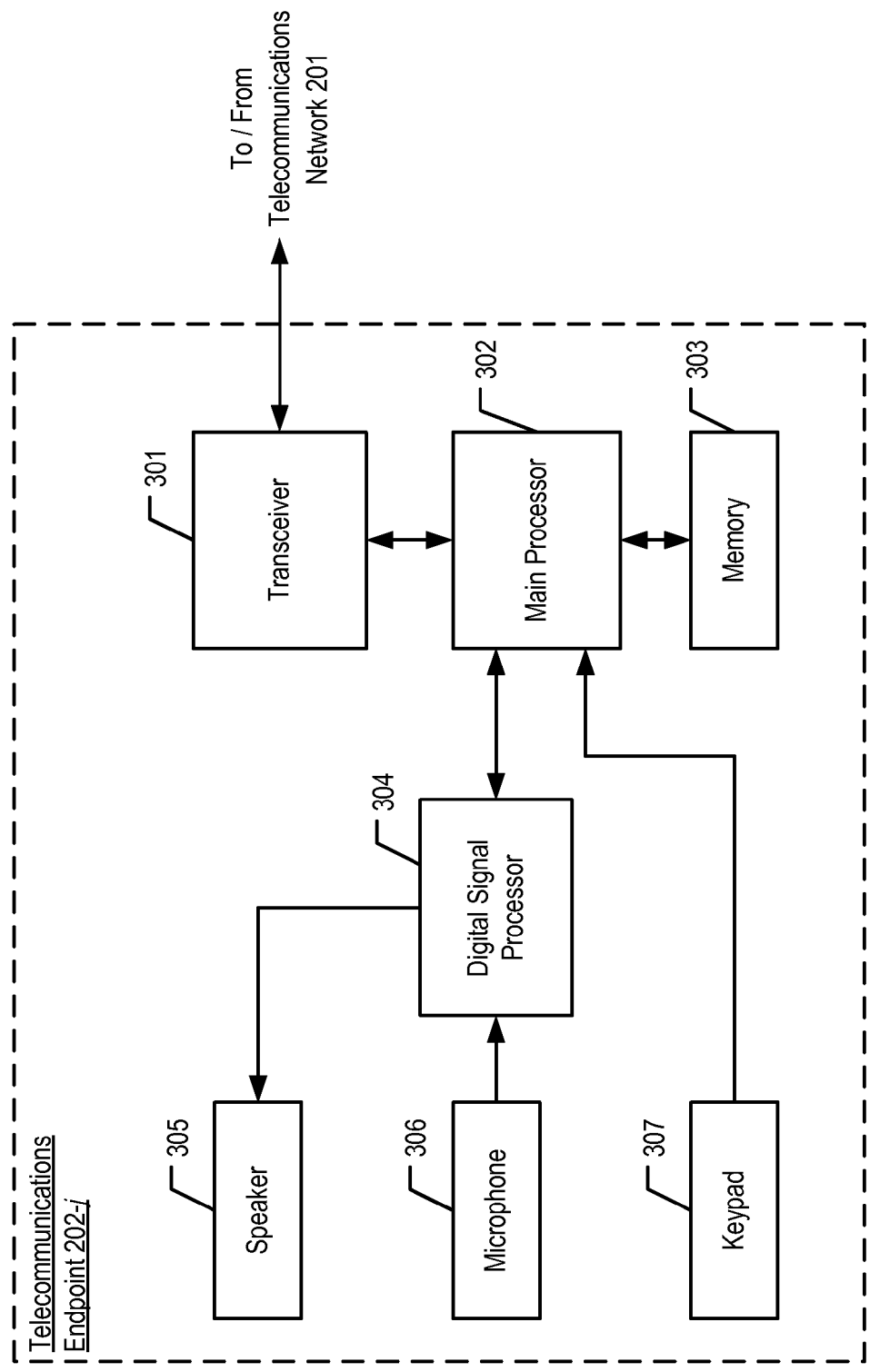
FIG. 3 depicts a block diagram of the salient components of telecommunications endpoint 202-j, in accordance with the illustrative embodiment of the present invention.

FIG. 3 depicts a block diagram of the salient components of telecommunications endpoint 202-$j$, in accordance with the illustrative embodiment of the present invention. Telecommunications endpoint 202-$j$ comprises: transceiver 301, main processor 302, memory 303, digital signal processor 304, speaker 305, microphone 306, and keypad 307, interconnected as shown. As those who are skilled in the art will appreciate, in some alternative embodiments, the salient components can be arranged differently than depicted.

Transceiver 301 comprises a receiving part and a transmitting part. The receiving part receives signals, in the form of packetized data samples and messages, from telecommunications network 201, and forwards the information encoded in the signals to main processor 302, in well-known fashion. The transmitting part receives information from main processor 302, and outputs signals that encode this information to telecommunications network 201, in well-known fashion. It will be clear to those skilled in the art how to make and use transceiver 301.

Main processor 302 is a general-purpose processor that is capable of: receiving information from transceiver 301, digital signal processor 304, and keypad 307; reading data from and writing data into memory 303; executing the tasks described below and with respect to FIGS. 4 through 6; and transmitting information to transceiver 301 and digital signal processor 304. In some alternative embodiments of the present invention, main processor 302 might be a special-purpose processor. In either case, it will be clear to those skilled in the art, after reading this disclosure, how to make and use main processor 302.

Memory 303 is a device that stores the instructions and data used by main processor 302. In accordance with the illustrative embodiment, memory 303 comprises a buffer that stores a series of data samples from network 201. It will be clear to those skilled in the art how to make and use memory 303.

Digital signal processor 304 is a special-purpose processor that is capable of: receiving information from main processor 302 and microphone 306; reading data from and writing data into memory 303; signal processing the signals that it receives; and transmitting information to transceiver 301 and speaker 305. In some alternative embodiments of the present invention, digital signal processor 304 a digital-to-analog converter, an analog-to-digital converter, or both. In any case, it will be clear to those skilled in the art, after reading this disclosure, how to make and use digital signal processor 304.

Speaker 305 converts electromagnetic signals into acoustic signals (e.g., intended for the end user, etc.), and microphone 306 converts acoustic signals (e.g., from the end user, etc.) into electromagnetic signals, both in well-known fashion.

Keypad 307 is a character and user-selection input device as is well known in the art that receives input from a user and transmits keypad signals that represent that input. Keypad 307 comprises fixed function keys and soft keys, as are known in the art.

In some alternative embodiments, telecommunications endpoint 202-$j$ also comprises a video display or a camera, or both, in well-known fashion. In those embodiments, endpoint 202-*j* can process data samples that represent video signals, in addition to data samples that represent acoustic signals.

Figure 4:
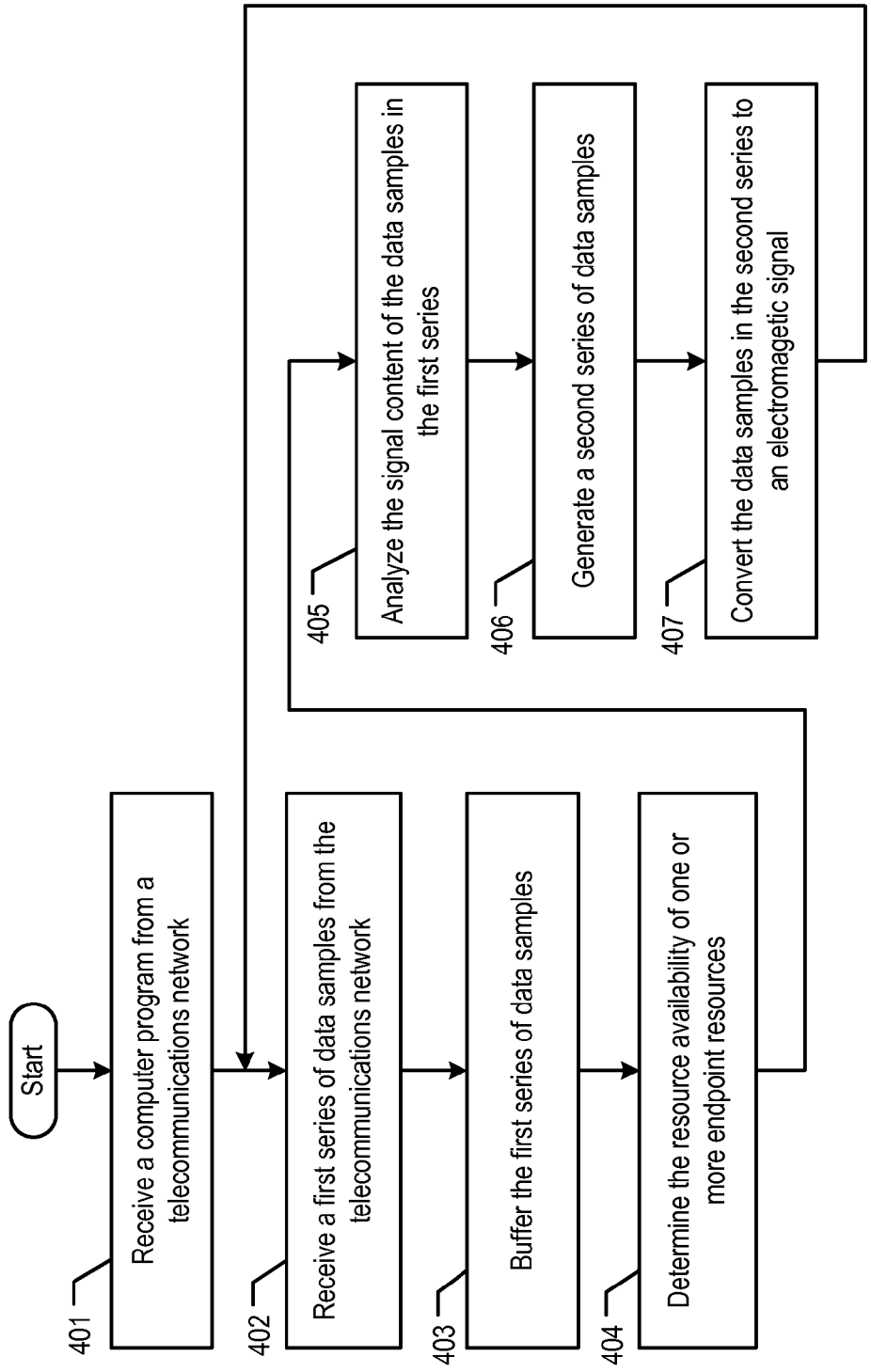
FIG. 4 depicts a flowchart of the operation of telecommunications endpoint 202-j when handling signals that it receives from telecommunications network 201, in accordance with the illustrative embodiment of the present invention.

FIG. 4 depicts a flowchart of the operation of telecommunications endpoint 202-*j* when handling signals that it receives from network 201, in accordance with the illustrative embodiment of the present invention. Although endpoint 202-*j* is depicted as receiving and processing signals received from network 201, it will be clear to those skilled in the art how to make and use embodiments of the present invention that receive and process signals from an end user, such as though microphone 306. Moreover, although endpoint 202-*j* is depicted as using a computer program that is downloaded from network 201, the computer program that endpoint 202-*j* uses can be installed through another means (e.g., during the manufacturing process, during initial configuring, etc.), in some alternative embodiments. Finally, it will be clear to those skilled in the art, after reading this specification, which tasks depicted in FIG. 4 can be performed simultaneously or in a different order than that depicted.

At task 401, endpoint 202-*j* determines whether to receive, store, and use a computer program from network 201. Task 401 is described in detail below and with respect to FIG. 5. Endpoint 202-*j* uses the downloaded computer program to execute some or all of tasks 402 through 407, in accordance with the illustrative embodiment of the present invention.

At task 402, endpoint 202-*j* receives, from network 201, a first series of data samples that represent an acoustic signal. In accordance with the illustrative embodiment, the data samples are generated as part of a telephone call that involves endpoint 202-*j* and its user.

At task 403, endpoint 202-*j* buffers, in memory 303, the received first series of data samples in a first-in, first-out fashion. In accordance with the illustrative embodiment, endpoint 202-*j* maintains the buffered data samples by using a write pointer, a read pointer, and one or more pop pointers, as are known in the art; the pointers are continually updated by main processor 302.

Endpoint 202-*j* is able to buffer in memory 303 a maximum of M data samples, wherein M is a positive integer with a value that depends on the resource availability of memory 303. The resource availability is initially determined as part of task 401 and then updated as part of task 404.

At task 404, endpoint 202-*j* determines the current resource availability of one or more of its resources, such as within main processor 302, memory 303, and digital signal processor 304. For example, main processor 302 can monitor its processor occupancy, the memory utilization of the endpoint, and so forth, and derive the availability of the resource of interest—that is, processing cycles, memory space, and so forth—when needed.

At task 405, endpoint 202-*j* analyzes the signal content in the first series of data samples. For example, processor 302 can determine the amplitude of the represented signal, the DC level of the signal, distortion, noise, loss of packets, level changes, echo, and so forth. In accordance with the illustrative embodiment, the type of analysis that is performed on the data samples depends on the computer program in use and, therefore, on the resource availability at endpoint 202-*j* of one or more of its resources.

At task 406, endpoint 202-*j* generates a second series of data samples, based on the signal content of the analyzed data samples in the first series and on the resource availability of one or more of its resources, as determined at task 404. Task 406 is described in detail below and with respect to FIG. 6.

At task 407, endpoint 202-*j* converts the data samples in the second series into an electromagnetic signal that represents a second acoustic signal, which is transmitted to the user via speaker 305. The degree to which the second acoustic signal differs from the first acoustic signal, which was represented by the data samples received at task 402, depends on the resource availability determined at task 404.

Task execution then proceeds to task 402, to process the next series of data samples that are received by endpoint 202-*j* as part of the ongoing call. Note that as the resource availability changes from series to series, the type and degree of processing that is performed by endpoint 202-*j* may change in some embodiments.

Figure 5:
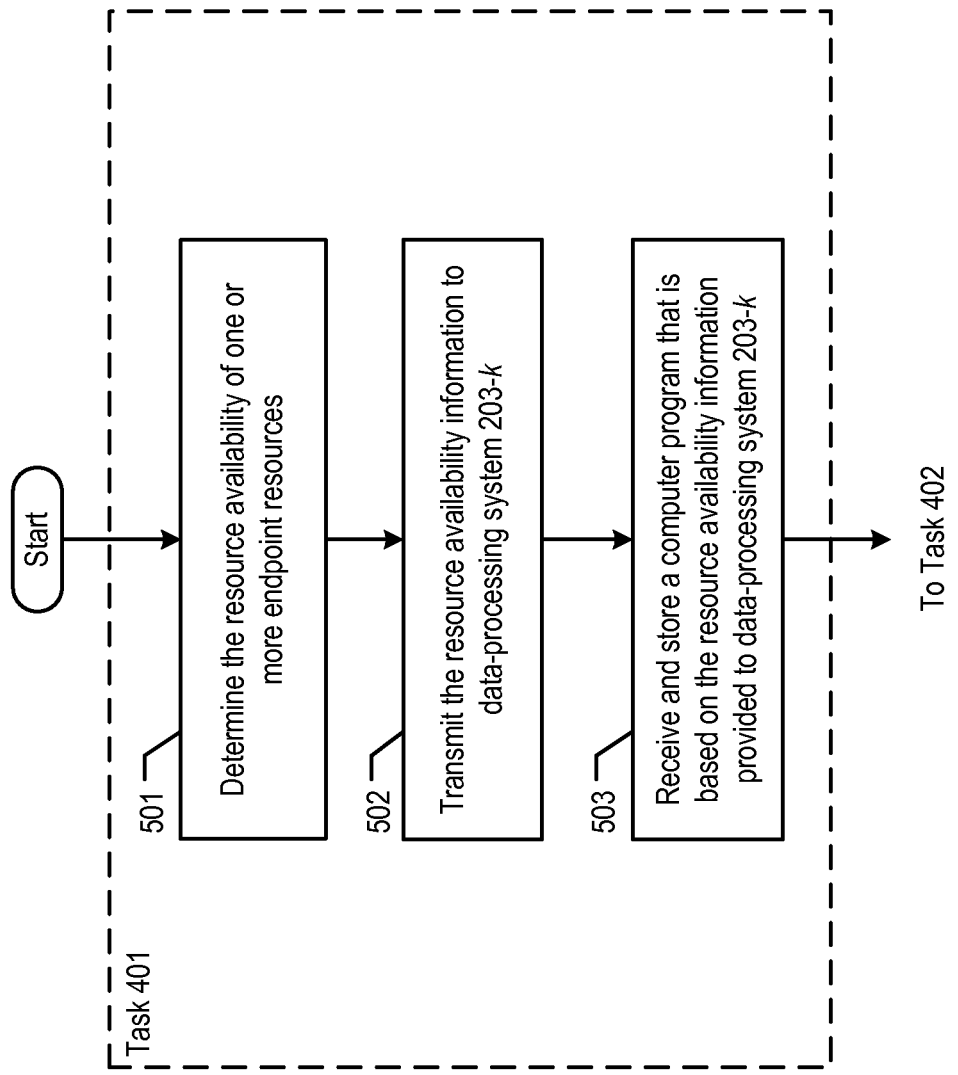
FIG. 5 depicts a flowchart of the operation of telecommunications endpoint 202-j when executing task 401.

FIG. 5 depicts a flowchart of the operation of telecommunications endpoint 202-*j* when executing task 401, in accordance with the illustrative embodiment of the present invention. The tasks that are depicted in FIG. 5 concern endpoint 202-*j* retrieving a computer program that is to be used to process signals that are part of a call. It will be clear to those skilled in the art, after reading this specification, which tasks depicted in FIG. 5 can be performed simultaneously or in a different order than that depicted.

At task 501, endpoint 202-*j* determines the current resource availability of one or more of its resources, such as within main processor 302, memory 303, and digital signal processor 304. For example, main processor 302 can assess its processor occupancy, the memory utilization, and so forth.

At task 502, endpoint 202-*j* transmits the current resource availability information that it determined at task 501 to data-processing system 203-*k*.

At task 503, endpoint 202-*j* receives a computer program from data-processing system 203-*k*. The computer program and aspects of the program (e.g., complexity, processing requirements, storage requirements, etc.) are dependent on the resource availability information that was transmitted at task 502. Task execution then proceeds to task 402.

In some alternative embodiments, endpoint 202-*j* spontaneously receives a computer program, in contrast to retrieving the program.

Figure 6:
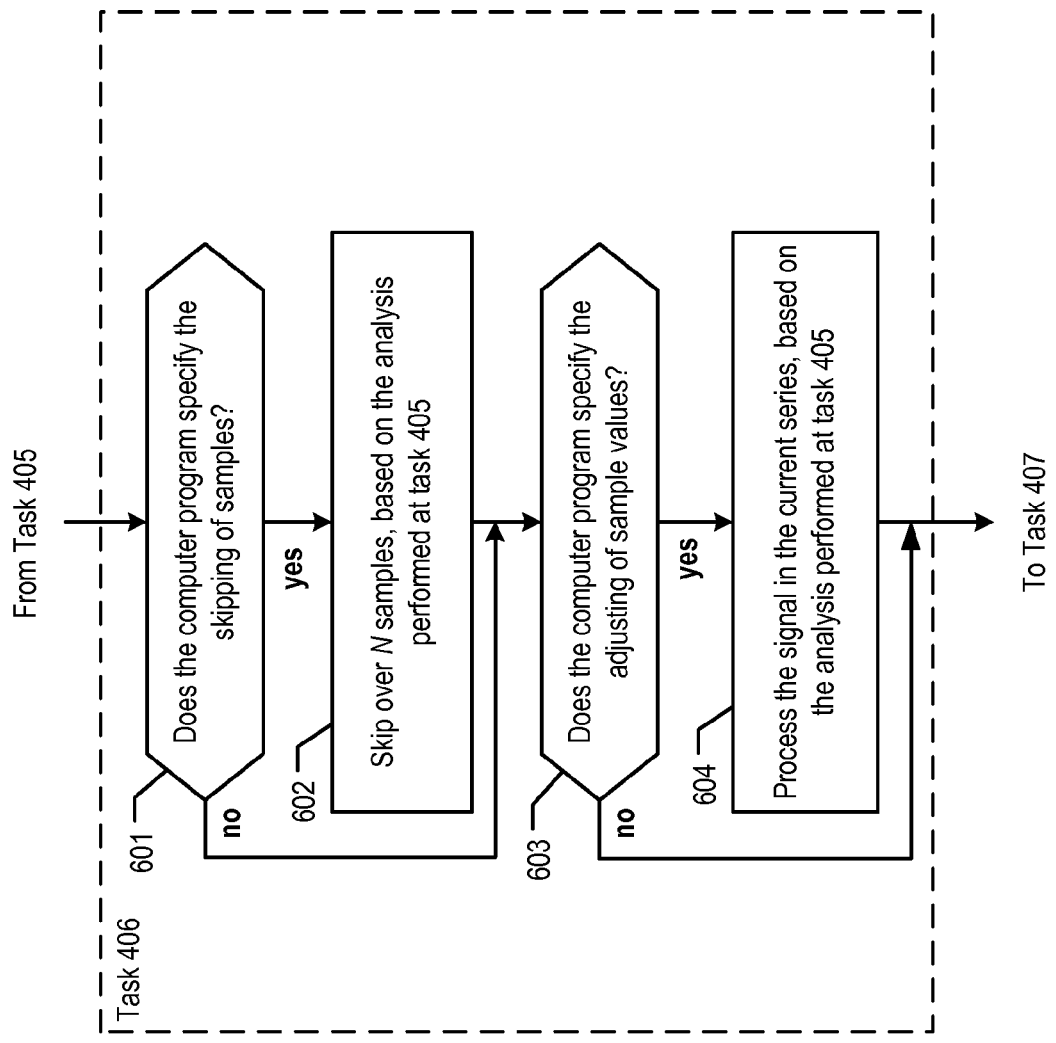
FIG. 6 depicts a flowchart of the operation of telecommunications endpoint 202-j when executing task 406.

FIG. 6 depicts a flowchart of the operation of telecommunications endpoint 202-*j* when executing task 406, in accordance with the illustrative embodiment of the present invention. The tasks that are depicted in FIG. 6 concern endpoint 202-*j* processing the input data samples with the downloaded computer program, resulting in a series of processed samples. It will be clear to those skilled in the art, after reading this specification, which tasks depicted in FIG. 6 can be performed simultaneously or in a different order than that depicted.

At task 601, endpoint 202-*j* determines whether a manipulation of the data sample buffer or an alteration of the data sample values is called for, or both. If buffer manipulation is called for, task execution proceeds to task 602. Otherwise, task execution proceeds to task 603.

At task 602, endpoint 202-*j* adjusts the buffer pointers to skip over N data samples in the first series, based on the computer program in use and on the results of the analysis performed at task 405 on the signal content of the data samples. N is a positive integer whose value is less than or equal to M, described above and with respect to task 403. For example, if a noise burst is detected in twenty consecutive data samples, endpoint 202-*j* skips by some or all of the twenty samples and possibly other (adjacent) samples as well. Endpoint 202-*j* might skip one or more data samples that correspond to an echo, depending on the type of echo and its duration. The skipped data samples are not passed along to any subsequent processing or to the user.

At task 603, endpoint 202-*j* determines whether an alteration of the data sample values is called for. If so, task execution proceeds to task 604. If not, task execution proceeds to task 407.

At task 604, endpoint 202-*j* processes the signal in the current series of data samples. The type of signal processing performed depends on the computer program in use. The type of signal processing performed comprises, but is not limited to, level-sensitive muting (i.e., squelching), automatic gain control (AGC), signal processing feedback to reduce distortion, and so forth. Furthermore, the signal processing might involve main processor 302 or digital signal processor 304, or both. After task 604, task execution proceeds to task 407.

In executing the signal processing computer program, telecommunications endpoint 202-*j* has the effect of offloading, from one or more data-processing systems 203-1 through 203-K, the generation of the processed second series of data samples, in accordance with the illustrative embodiment of the present invention. In some alternative embodiments, as those who are skilled in the art will appreciate, endpoint 202-*j* has the effect of augmenting signal processing that is still performed by one or more data-processing systems 203-1 through 203-K.

It is to be understood that the above-described embodiments are merely illustrative of the present invention and that many variations of the above-described embodiments can be devised by those skilled in the art without departing from the scope of the invention. For example, in this specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A telecommunications endpoint comprising:
   a receiver for receiving, from a telecommunications network, a first series of data samples that represent a first acoustic signal;
   a memory for buffering the first series of data samples; and
   a processor for:
      i) determining a resource availability of a predetermined resource at the telecommunications endpoint, and
      ii) generating a second series of data samples, based on signal content of the data samples in the first series;
   wherein the telecommunications endpoint, based on the resource availability of the predetermined resource, offloads the generation of the second series of data samples from a data-processing system in the telecommunications network.

2. The telecommunications endpoint of claim 1 wherein the receiver is also for receiving a computer program from the telecommunications network, wherein the memory is also for storing the computer program, and wherein the processor uses the computer program for the generation of the second series of data samples.

3. The telecommunications endpoint of claim 2 wherein the receiving of the computer program depends on the resource availability of the predetermined resource.

4. The telecommunications endpoint of claim 1 wherein the predetermined resource is the memory, wherein the telecommunications endpoint is able to buffer a maximum of M data samples in the memory, wherein the value of M depends on the resource availability of the memory, and wherein M is a positive integer.

5. The telecommunications endpoint of claim 4, wherein the generating of the second series of data samples involves skipping over N data samples in the memory, wherein the value of N depends on the signal content of the data samples, and wherein N is a positive integer that is less than or equal to M.

6. The telecommunications endpoint of claim 1 wherein the predetermined resource is the processor, wherein the processor is also for analyzing the signal content of the data samples in the first series, and wherein the type of analysis depends on the resource availability of the processor.

7. The telecommunications endpoint of claim 1 further comprising a digital-to-analog converter for converting the data samples in the second series into an electromagnetic signal that represents a second acoustic signal, wherein the degree to which the second acoustic signal differs from the first acoustic signal depends on the resource availability of the predetermined resource.

8. A method comprising:
   receiving at a telecommunications endpoint, from a telecommunications network, a first series of data samples that represent a first acoustic signal;
   buffering the first series of data samples;
   determining a resource availability of a predetermined resource at the telecommunications endpoint; and
   generating a second series of data samples, based on signal content of the data samples in the first series;
   wherein the telecommunications endpoint, based on the resource availability of the predetermined resource, offloads the generation of the second series of data samples from a data-processing system in the telecommunications network.

9. The method of claim 8 further comprising receiving a computer program from the telecommunications network into a memory, wherein the telecommunications endpoint uses the computer program for the generation of the second series of data samples.

10. The method of claim 9 wherein the receiving of the computer program depends on the resource availability of the predetermined resource.

11. The method of claim 8 wherein the predetermined resource is a memory, wherein the telecommunications endpoint is able to buffer a maximum of M data samples in the memory, wherein the value of M depends on the resource availability of the memory, and wherein M is a positive integer.

12. The method of claim 11, wherein the generating of the second series of data samples involves skipping over N data samples in the first series in the memory, wherein the value of N depends on the signal content of the data samples, and wherein N is a positive integer that is less than or equal to M.

13. The method of claim 8 further comprising analyzing the signal content of the data samples in the first series, wherein the predetermined resource is a processor, and wherein the type of analysis depends on the resource availability of the processor.

14. A telecommunications endpoint comprising:
   a receiver for receiving, from a telecommunications network, i) a computer program, and ii) a first series of data samples that represent a first acoustic signal;
   a memory for i) storing the computer program, and ii) buffering the first series of data samples; and
   a processor for i) determining a resource availability of a predetermined resource at the telecommunications endpoint, and ii) using the computer program for generating a second series of data samples by skipping over N data samples in the first series in the memory, wherein the value of N is based on signal content of the data samples, and wherein N is a positive integer
   wherein the telecommunications endpoint offloads, from a data-processing system in the telecommunications network, the generation of the second series of data samples; and
   wherein the computer program received depends on the resource availability of the predetermined resource.

15. The telecommunications endpoint of claim 14 wherein the predetermined resource is the memory, wherein the telecommunications endpoint is able to buffer a maximum of M data samples in the memory, wherein the value of M depends on the resource availability of the predetermined resource, wherein M is a positive integer, and wherein N is less than or equal to M.

16. The telecommunications endpoint of claim 14 wherein the predetermined resource is the processor, wherein the processor is also for analyzing the signal content of the data samples in the first series, wherein the type of analysis depends on the resource availability of the processor.

17. A method comprising:
   determining a resource availability of a predetermined resource at a telecommunications endpoint;
   receiving at the telecommunications endpoint, from a telecommunications network, i) a computer program, and ii) a first series of data samples that represent a first acoustic signal, wherein the computer program received is based on the resource availability of the predetermined resource;
   buffering the first series of data samples in a memory; and
   generating, based on the computer program, a second series of data samples by skipping over N data samples in the first series in the memory, wherein the value of N is based on signal content of the data samples, and wherein N is a positive integer;
   wherein the telecommunications endpoint offloads, from a data-processing system in the telecommunications network, the generation of the second series of data samples.

18. The method of claim 17 wherein the predetermined resource is the memory, wherein the telecommunications endpoint is able to buffer a maximum of M data samples in the memory, wherein the value of M depends on the resource availability of the predetermined resource, wherein M is a positive integer, and wherein N is less than or equal to M.

19. The method of claim 17 wherein the predetermined resource is a processor, wherein the processor is for analyzing the signal content of the data samples in the first series, wherein the type of analysis depends on the resource availability of the processor.

* * * * *